(12) United States Patent
Yin

(10) Patent No.: US 7,145,559 B2
(45) Date of Patent: Dec. 5, 2006

(54) DISPLAY DEVICE POWER SAVINGS

(75) Inventor: Memphis Zhihong Yin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 271 days.

(21) Appl. No.: 10/015,912

(22) Filed: Oct. 30, 2001

(65) Prior Publication Data

US 2003/0080954 A1    May 1, 2003

(51) Int. Cl.
*G09G 5/00* (2006.01)
(52) U.S. Cl. .................. 345/211; 345/156; 713/300
(58) Field of Classification Search ........ 345/156–157, 345/211–213, 204, 168, 173, 87; 713/300, 713/310, 320, 321, 323–325, 330, 340
See application file for complete search history.

(56) References Cited

U.S. PATENT DOCUMENTS

| 4,065,916 | A | * | 1/1978 | Leuschner | 368/70 |
| 5,703,629 | A | * | 12/1997 | Mermelstein et al. | 345/213 |
| 5,886,689 | A | * | 3/1999 | Chee et al. | 345/212 |
| 6,081,902 | A | * | 6/2000 | Cho | 713/330 |
| 6,278,887 | B1 | * | 8/2001 | Son et al. | 455/566 |
| 6,450,958 | B1 | * | 9/2002 | Linkhart et al. | 600/437 |
| 2003/0009705 | A1 | * | 1/2003 | Thelander et al. | 713/340 |

* cited by examiner

Primary Examiner—Xiao Wu

(57) ABSTRACT

An electronic or computing device includes an integrated graphical display and a power source, such as a battery, to provide power to operate the graphical display. A selectable shutdown control, such as an operating system shutdown control, is displayed on the graphical display, and when selected, initiates a process to shutdown the electronic or computing device. The device also includes a component, such as a graphical display controller or software application, to turn off the graphical display and conserve power when the selectable control is selected and before the process to shutdown the electronic or computing device is initiated.

39 Claims, 4 Drawing Sheets

DISPLAY DEVICE POWER SAVINGS

TECHNICAL FIELD

This invention relates to saving power utilized by a display device and, in particular, to display device battery power savings when shutting down a portable computing device.

BACKGROUND

A portable computing device typically has an integrated display device to display images, graphics, and text. Many portable computing and integrated display devices are powered from a battery source included with the computing device. One issue that users of portable computers are particularly concerned with is battery life. The more battery power that can be conserved, the longer a portable computer can used, particularly when alternative power sources may not be available, such as on an airplane.

FIG. 1 illustrates a conventional portable computer 100 having a housing base 102 and a housing top 104. Housing base 102 and housing top 104 are coupled together via a hinge or other flexible joint (not shown) to permit housing top 104 to fold down over housing base 102. A keyboard assembly 106 is mounted within housing base 102 and a graphical display 108 is mounted within housing top 104.

Portable computer 100 includes a push-button 110 to turn the computer on and off. Additionally, computer 100 includes an operating system shutdown control 112 that is displayed on graphical display 108. When the shutdown control 112 is selected, such as with a mouse or other pointing device, the operating system and any other processes running on computer 100 are shut down to a point at which it is safe to turn off the power to computer 100, such as with push-button 110. Typically, an operating system shutdown process can also turn off the power to computer 100 if the system supports a power-off feature.

When the operating system shutdown control 112 is selected, the operating system typically generates an informational message 114 that is displayed on graphical display 108 to indicate to a user that the operating system is performing a shutdown of computer 100. Graphical display 108 consumes batter power to display such messages when computer 100 is operating on battery power. Although informative, such messages typically do not convey user interaction instructions, and shutting down computer 100 does not require any other user interaction other than selecting the operating system shutdown control 112. Accordingly, the battery power that is used to power graphical display 108 to display message 114 can be conserved.

The following description discusses systems and methods for saving power utilized by a display device when a process is initiated to shut down a portable electronic or computing device.

SUMMARY

An electronic or computing device includes an integrated graphical display and a power source, such as a battery, to provide power to operate the graphical display. A selectable shutdown control, such as an operating system shutdown control, is displayed on the graphical display, and when selected, initiates a process to shutdown the electronic or computing device.

The electronic or computing device also includes a component, such as a graphical display controller or software application, to determine when the selectable control is selected. The component turns off the graphical display to conserve power when the selectable control is selected and before the process to shutdown the portable computing device is initiated.

BRIEF DESCRIPTION OF THE DRAWINGS

The same numbers are used throughout the drawings to reference like features and components.

DETAILED DESCRIPTION

Introduction

The following describes systems and methods for display device power savings when shutting down a portable electronic or computing device. When a shutdown control is selected to initiate a shutdown process of the portable electronic or computing device, a graphical display of the portable device is turned off before the process is initiated to conserve the device's battery power.

In the described embodiments, a display device is illustrated and described as a graphical display integrated with a portable computing device. However, the described systems and methods for display device power savings are applicable to many different types of mobile electronic and computing devices of varying sizes and designations. Such mobile devices include laptop computers, handheld computers, notebook computers, palm-sized computers, pocket computers, personal digital assistants, personal organizers, cellular phones, and other similar devices having an integrated display device. The specific examples described in this disclosure are not meant to limit the scope of the claims or the description, but are meant to provide a specific understanding of the described implementations.

Exemplary Computer Architecture

Figure 1:
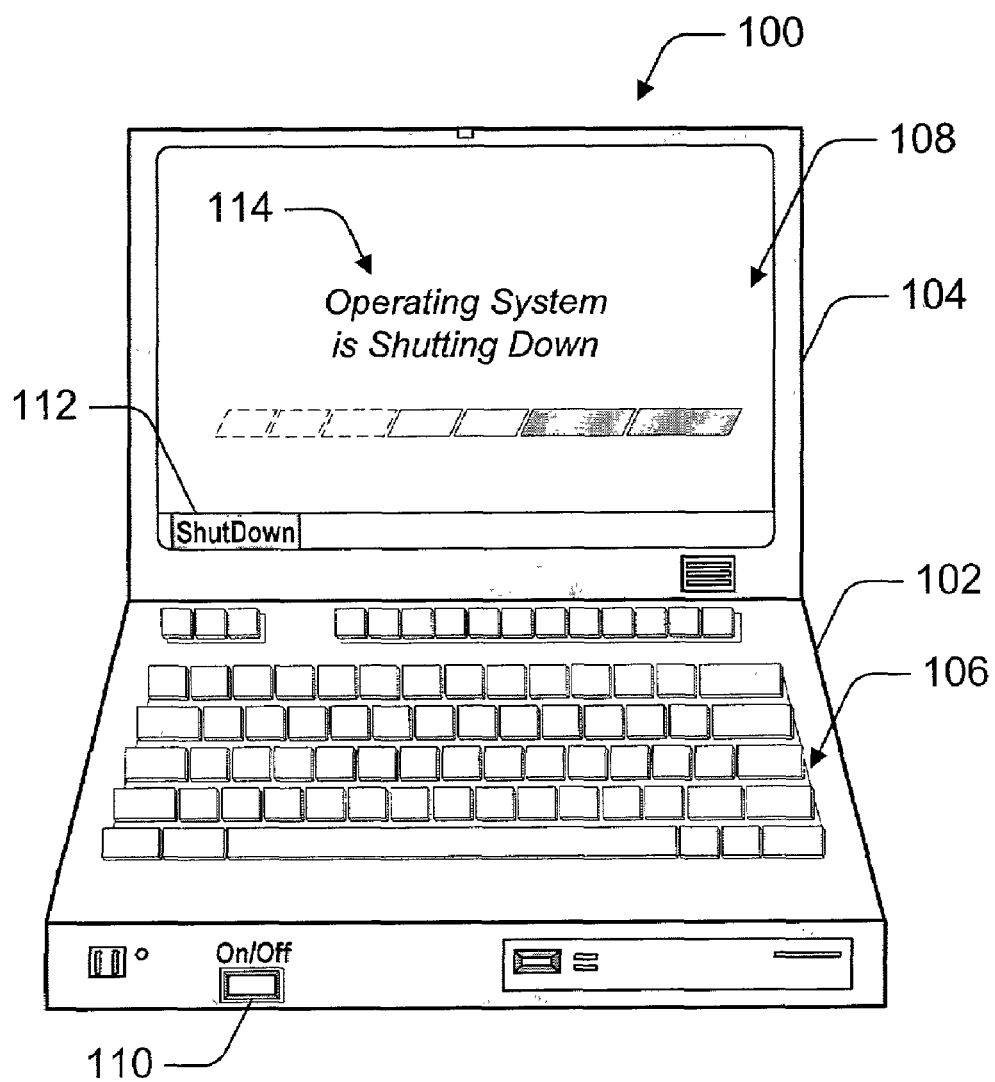
FIG. 1 illustrates a conventional portable computing device.
Figure 2:
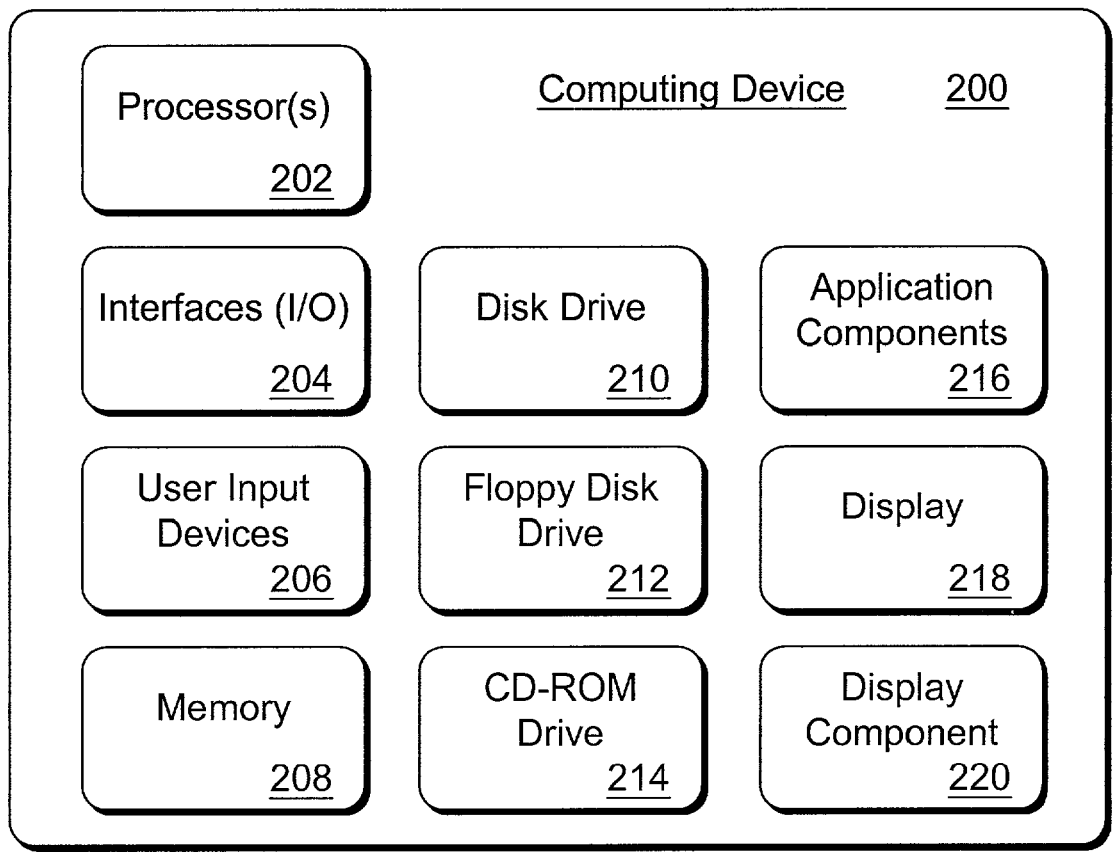
FIG. 2 is block diagram that illustrates various components of an exemplary computing device.

FIG. 2 illustrates various components of an exemplary computing device 200 that can be utilized to implement the inventive techniques described herein. Computer 200 includes one or more processors 202, interfaces 204 for the input and output of data, and user input devices 206. Processor(s) 202 process various instructions to control the operation of computer 200, while interfaces 204 provide a mechanism for computer 200 to communicate with other electronic and computing devices. User input devices 206 include a keyboard, mouse, pointing device, and/or other mechanisms to interact with, and to input information to computer 200.

Input/output interfaces 204 can include serial, parallel, and network interfaces. A network interface allows devices coupled to a common data communication network to communicate information with computing device 200. Similarly, a serial and/or parallel interface provides a data communication path directly between computing device 200 and another electronic or computing device.

Computer 200 also includes a memory 208 (such as ROM and/or RAM), a disk drive 210, a floppy disk drive 212, and a CD-ROM drive 214. Memory 208, disk drive 210, floppy disk drive 212, and CD-ROM drive 214 provide data storage mechanisms for computer 200. Although not shown, a system bus typically connects the various components within computing device 200.

Computer 200 also includes application components 216 and can include an integrated display device 218, such as for a personal digital assistant (PDA), portable computing device, and similar mobile electronic and computing devices. Application components 216 provide a runtime environment in which software applications or components can run or execute on processor(s) 202.

Computer 200 also includes a display component 220, such as a display controller, which can be implemented as hardware, software, firmware, or any combination thereof to process image data for display, such as on integrated display device 218, or an externally connected monitor.

Exemplary Portable Computing Device and Power Saving System

Figure 3:
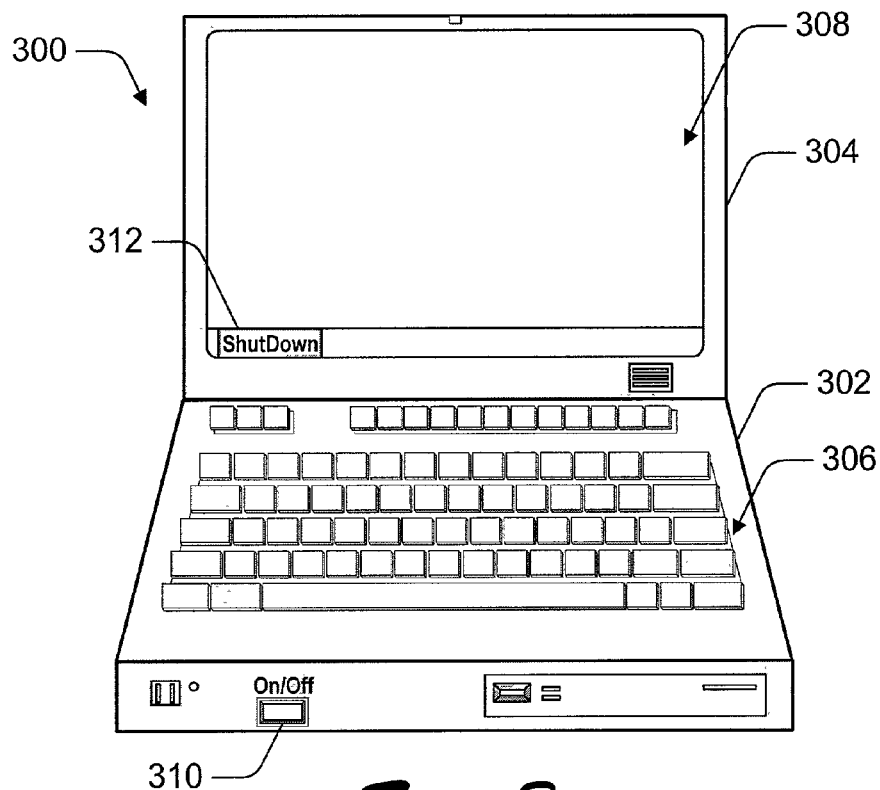
FIG. 3 illustrates an exemplary portable computing device.

FIG. 3 illustrates an exemplary portable computing device 300 having a housing base 302 and a housing top 304. Housing base 302 and housing top 304 are coupled together via a hinge or other flexible joint (not shown) to permit housing top 304 to fold down over housing base 302. A keyboard assembly 306 is mounted within housing base 302 and a graphical display 308 is mounted within housing top 304.

Portable computing device 300 includes a push-button 310 to turn the computing device on and off. Additionally, computing device 300 includes an operating system shutdown control 312 that is displayed on graphical display 308. When the shutdown control 312 is selected, such as with a mouse or other pointing device, a process is initiated to shutdown computing device 300. The process shuts down the operating system and any other processes running on computer 300 to a point at which it is safe to turn off the power to computer 300. The shutdown process also turns off the power to computing device 300.

Figure 4:
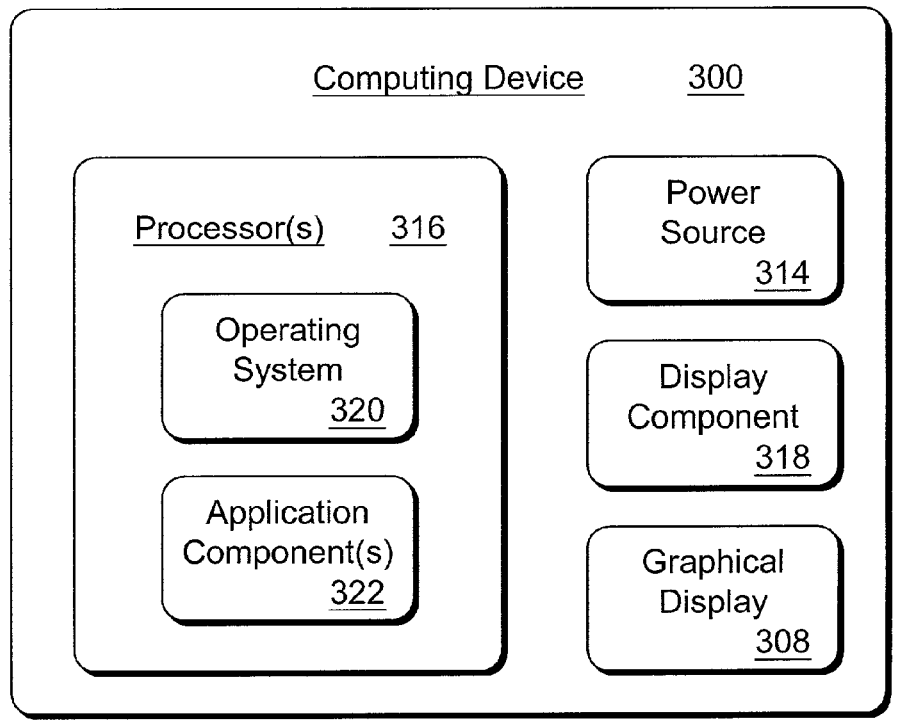
FIG. 4 is a block diagram that illustrates components of the exemplary computing device shown in FIG. 3.

FIG. 4 illustrates components of portable computing device 300 (FIG. 3) which includes a power source 314, such as a battery component, that is depleted of available power when computing device 300 is operating on battery power. Computing device 300 can include one or more of the components of exemplary computing device 200 (FIG. 2).

Computing device 300 includes one or processors 316 and a display component 318, such as a graphical display controller that processes image data to display a corresponding image on graphical display 308. Display component 318 can include a microcontroller, integrated circuit, or similar video processing component to process image data. Display component 318 also generates the selectable shutdown control 312 for display on graphical display 308.

Computing device 300 includes an operating system 320 and application components 322 that run or execute on processor(s) 316. When the operating system shutdown control 312 is selected, a component, such as display component 318 or application component 322, turns off graphical display 308 to conserve power before the process to shutdown computing device 300 is initiated. An application component 322 can be implemented to determine when shutdown control 312 is selected, and turn off graphical display 308.

Turning off graphical display 308 when shutdown control 312 is selected, and before the process to shutdown computing device 300 is initiated, conserves power 314 that would otherwise be utilized to operate graphical display 308 to display information pertaining to the operating system 320 shutting down computing device 300. It should be recognized that shutdown control 312 is also not displayed on graphical display 308 after the graphical display is turned off to conserve power.

Method for Display Device Power Savings

Figure 5:
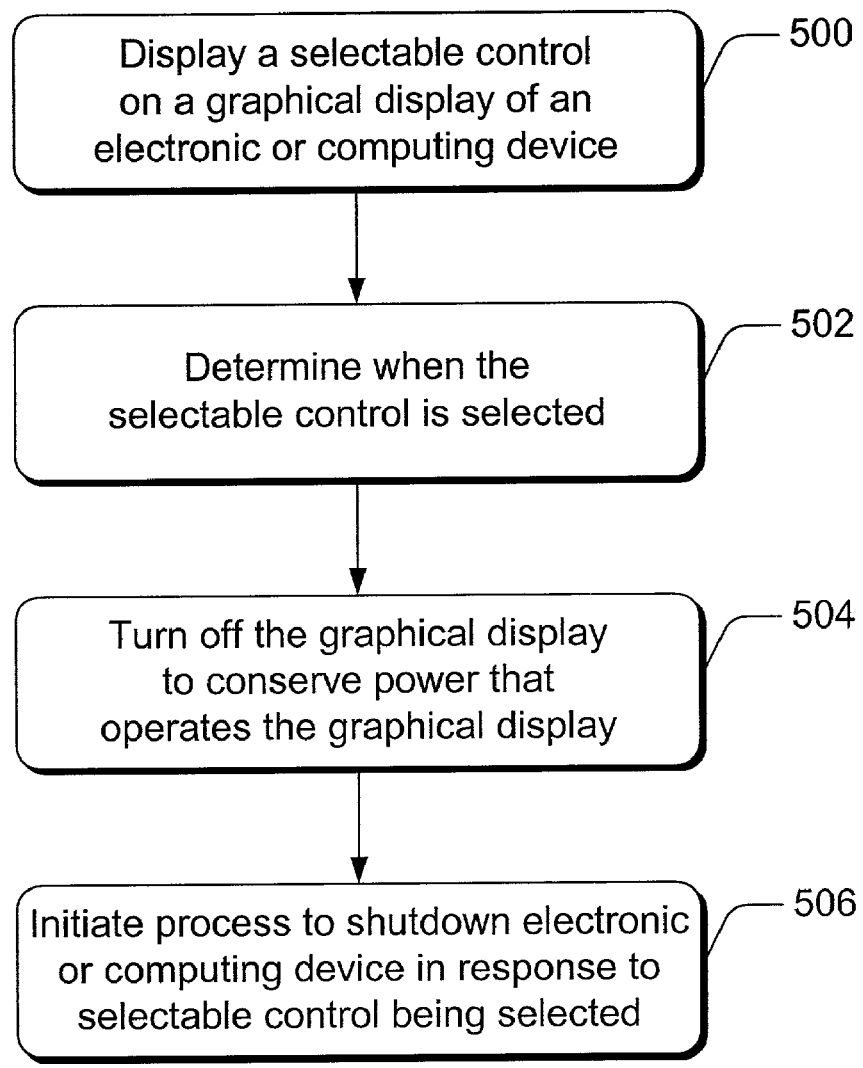
FIG. 5 is a flow diagram that describes a method for display device power savings.

FIG. 5 illustrates a method for display device power savings The order in which the method is described is not intended to be construed as a limitation. Furthermore, the method can be implemented in any suitable hardware, software, firmware, or combination thereof.

At block 500, a selectable control is displayed on a graphical display of an electronic or computing device. An example of the selectable control is operating system shutdown control 312 displayed on graphical display 308 of computing device 300 (FIG. 3).

At block 502, a determination is made as to when the selectable control is selected. For example, an application component 322 can be implemented to determine when shutdown control 312 is selected.

At block 504, the graphical display is turned off to conserve power that operates the graphical display. For example, display component 318 and/or an application component 322 can be implemented to turn off graphical display 308 to conserve power 314.

At block 506, a process is initiated to shutdown the electronic or computing device in response to the selectable control being selected. For example, operating system 320 and computing device 300 are shutdown and powered off.

Conclusion

The systems and methods for display device power savings described herein conserve power when shutting down a portable electronic or computing device. When a shutdown control is selected to initiate a shutdown process of the portable electronic or computing device, a graphical display of the portable device is turned off before the process is initiated to conserve the device's battery power.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A portable computing device, comprising:
   a graphical display;
   a power source configured to provide power to operate the graphical display;
   a selectable control configured to initiate a shutdown of an operating system running on the portable computing device and to initiate turning off power to operate the portable computing device; and
   a component configured to turn off the graphical display and conserve the power to operate the graphical display when the selectable control is selected and before the shutdown of the operating system running on the portable computing device is initiated.

2. A portable computing device as recited in claim 1, wherein the graphical display is configured to display the selectable control.

3. A portable computing device as recited in claim 1, wherein the component is a graphical display controller.

4. A portable computing device as recited in claim 1, wherein the component is further configured to determine when the selectable control is selected.

5. A portable computing device as recited in claim 1, wherein the component is a software application configured to determine when the selectable control is selected.

6. An electronic device, comprising:
a graphical display;
a selectable control configured to initiate a shutdown of an operating system running on the electronic device and to initiate turning off power to operate the electronic device; and
a component configured to turn off the graphical display when the selectable control is selected and before the shutdown of the operating system running on the electronic device is initiated.

7. An electronic device as recited in claim 6, further comprising a power source, wherein power to operate the graphical display is conserved when the component turns off the graphical display.

8. An electronic device as recited in claim 6, wherein the graphical display is configured to display the selectable control.

9. An electronic device as recited in claim 6, wherein the component is further configured to determine when the selectable control is selected.

10. An electronic device as recited in claim 6, wherein the component is a software application configured to determine when the selectable control is selected.

11. A display device, comprising:
a graphical display; and
a display component configured to turn off the graphical display when an operating system shutdown control is selected and before a process to shutdown the operating system is initiated.

12. A display device as recited in claim 11, further comprising a power source, wherein power to operate the graphical display is conserved when the display component turns off the graphical display.

13. A display device as recited in claim 11, wherein the graphical display is configured to display the operating system shutdown control.

14. A display device as recited in claim 11, wherein the display component is further configured to determine when the operating system shutdown control is selected.

15. A display device as recited in claim 11, wherein the display component is a graphical display controller.

16. A method, comprising:
initiating a shutdown of an operating system running on a computing device in response to a selectable control being selected;
turning off a graphical display of the computing device to conserve power that operates the graphical display when the selectable control is selected and before initiating the shutdown of the operating system running on the computing device; and
turning off power to operate the computing device in response to the selectable control being selected.

17. A method as recited in claim 16, further comprising displaying the selectable control on the graphical display.

18. A method as recited in claim 16, further comprising determining when the selectable control is selected.

19. A method as recited in claim 16, wherein turning off the graphical display includes turning off a graphical display controller.

20. One or more computer-readable media comprising computer executable instructions that, when executed, direct a portable computing device to perform a method comprising:
initiating a shutdown of an operating system running on the portable computing device in response to an operating system selectable control being selected;
turning off a graphical display of the portable computing device to conserve power to operate the graphical display when the operating system selectable control is selected and before initiating the shutdown of the operating system running on the portable computing device; and
turning off power to operate the portable computing device in response to the operating system selectable control being selected.

21. One or more computer-readable media as recited in claim 20, further comprising displaying the operating system selectable control on the graphical display.

22. One or more computer-readable media as recited in claim 20, further comprising determining when the operating system selectable control is selected.

23. A computing device, comprising:
a graphical display;
a power source configured to power the graphical display; and
a component configured to turn off the graphical display and conserve the power before shutdown of an operating system running on the computing device.

24. A computing device as recited in claim 23, wherein the component is further configured to shutdown the computing device after the shutdown of the operating system.

25. A computing device as recited in claim 23, wherein the graphical display is configured to display a selectable control that, when selected, initiates a shutdown process of the computing device, the shutdown process configured to first turn off the graphical display, second shut down the operating system, and third shut down the computing device.

26. A computing device as recited in claim 23, further comprising a selectable control that, when selected, initiates a shutdown process of the computing device, the shutdown process configured to first turn off the graphical display, second shut down the operating system, and third shut down the computing device.

27. A computing device as recited in claim 23, further comprising a selectable control that, when selected, initiates a shutdown process to first turn off the graphical display and second shutdown the operating system, and wherein the component is further configured to determine when the selectable control is selected.

28. A method, comprising:
receiving a selectable input to initiate a shutdown process of a computing device;
turning off a graphical display of a computing device to conserve power when the shutdown process is initiated; and
shutting down an operating system running on the computing device after turning off the graphical display.

29. A method as recited in claim 28, further comprising turning off power to operate the computing device after first turning off the graphical display and second shutting down the operating system.

30. A method as recited in claim 28, further comprising initiating the shutdown process to first turn off the graphical display, second shutdown the operating system, and third shutdown the computing device.

31. A method as recited in claim 28, further comprising displaying a selectable control on the graphical display, and wherein receiving the selectable input includes receiving the selectable input via the selectable control displayed on the graphical display.

32. One or more computer readable media comprising computer executable instructions that, when executed, direct a computing device to:
- receive a selectable input to initiate a shutdown process of the computing device;
- turn off a graphical display of the computing device to conserve power when the shutdown process is initiated; and
- shutdown an operating system running on the computing device after the graphical display is turned off.

33. One or more computer readable media as recited in claim 32, further comprising computer executable instructions that, when executed, direct the computing device to turn off power to operate the computing device after the graphical display is turned off before the operating system is shutdown.

34. One or more computer readable media as recited in claim 32, further comprising computer executable instructions that, when executed, direct the computing device to initiate the shutdown process to first turn off the graphical display, second shutdown the operating system, and third shutdown the computing device.

35. One or more computer readable media as recited in claim 32, further comprising computer executable instructions that, when executed, direct the computing device to display a selectable control on the graphical display and receive the selectable input via the selectable control.

36. A computing device, comprising:
- means to receive a selectable input to initiate a shutdown process of the computing device;
- means to turn off a graphical display of the computing device to conserve power when the shutdown process is initiated; and
- means to shutdown an operating system running on the computing device after the graphical display is turned off.

37. A computing device as recited in claim 36, further comprising means to turn off power to operate the computing device after the graphical display is turned off before the operating system is shutdown.

38. A computing device as recited in claim 36, further comprising means to initiate the shutdown process to first turn off the graphical display, second shutdown the operating system, and third shutdown the computing device.

39. A computing device as recited in claim 36, further comprising means to display a selectable control on the graphical display and receive the selectable input via the selectable control.

* * * * *